United States Patent [19]
Patel

[11] 3,726,282
[45] Apr. 10, 1973

[54] INFLATION VALVE FOR CATHETER RETENTION BALLOON

[75] Inventor: Bhupendra C. Patel, Elgin, Ill.

[73] Assignee: The Kendall Company, Boston, Mass.

[22] Filed: Sept. 30, 1971

[21] Appl. No.: 185,018

[52] U.S. Cl. ..........128/349 BV, 137/525, 251/149.6
[51] Int. Cl. .............................................A61m 25/02
[58] Field of Search......................128/349 R, 349 B, 128/349 BV, 350 V; 251/149.6, 149.7, 223; 137/525

[56] References Cited

UNITED STATES PATENTS

| 3,192,949 | 7/1965 | DeSee | 128/349 BV UX |
| 3,385,301 | 5/1968 | Harautuneian | 128/349 BV |
| 3,575,221 | 4/1971 | Mochizuki | 251/149.6 X |

Primary Examiner—Lucie H. Laudenslager
Attorney—Robert D. Chodera

[57] ABSTRACT

An inflation valve for a retention balloon in a catheter having an inflation lumen communicating with the balloon. The valve has a housing defining a chamber, opening means at one end of the housing communicating between the chamber and the inflation lumen, and an inwardly directed flange at the other end of the housing. A rim is secured to the flange and has a first portion projecting into the chamber, a second portion projecting outwardly from the flange, and a tapered passageway extending through the rim. The valve also includes a compressible plug received in the chamber and having a first shoulder, a neck extending from the first shoulder, a second shoulder extending from the neck, and a tapered stopper extending from the second shoulder and received in the passageway. The plug biases the stopper against the tapered portion of the passageway in sealing engagement to prevent passage of fluid from the chamber, and the plug compresses responsive to the insertion of a syringe tip into the passageway from its outer end to permit passage of fluid from the syringe into the chamber and inflation lumen.

8 Claims, 9 Drawing Figures

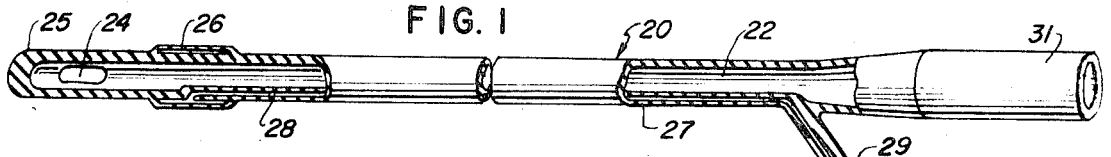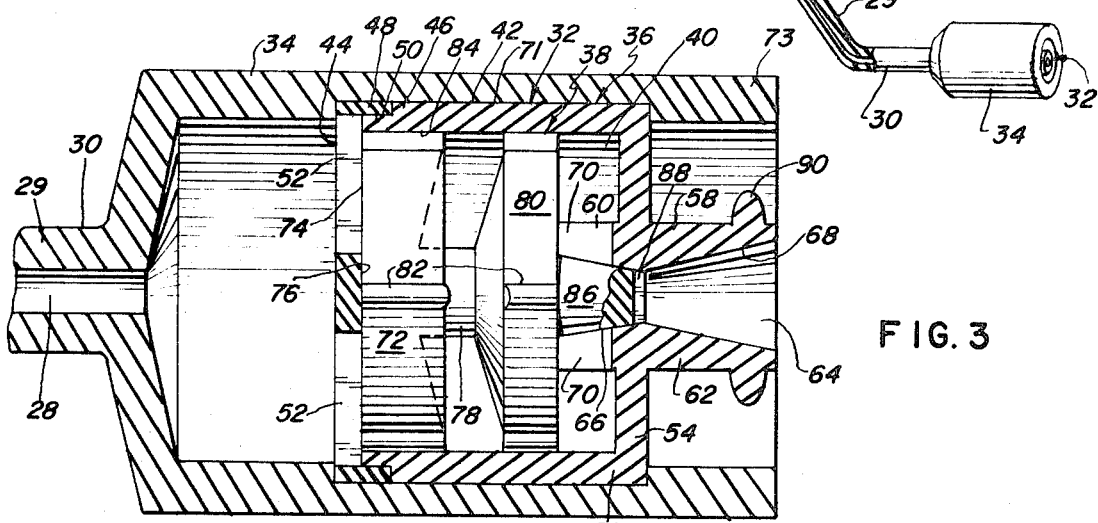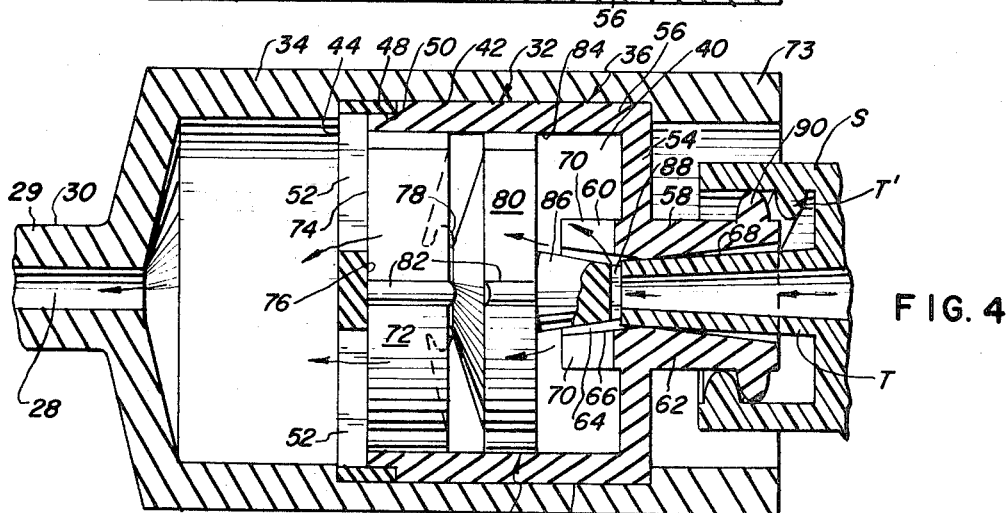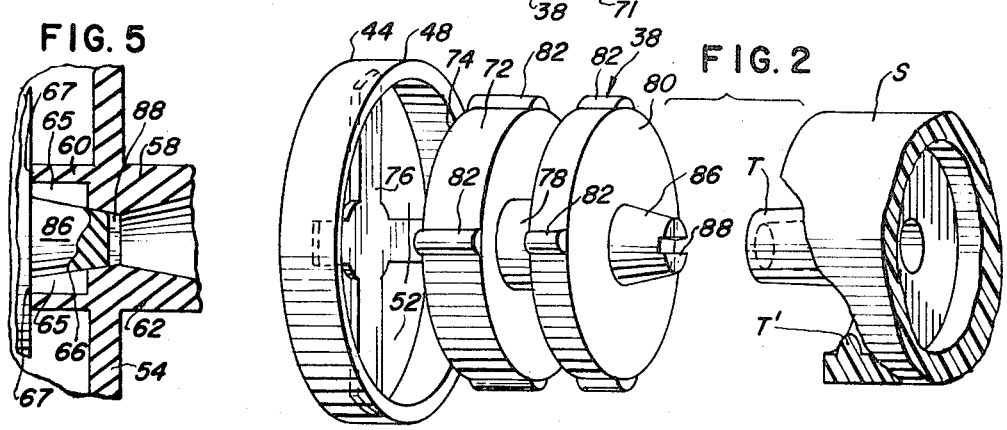

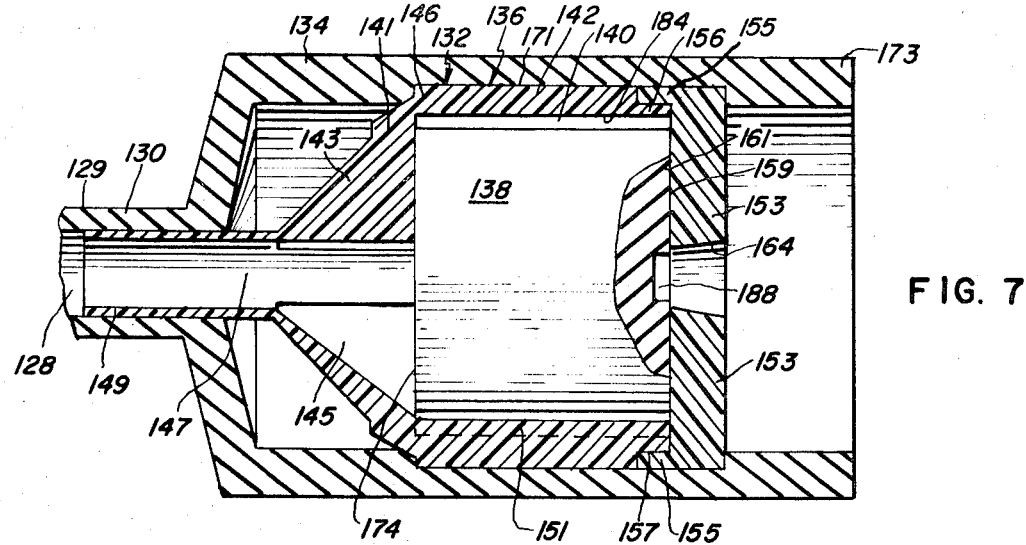
FIG. 7
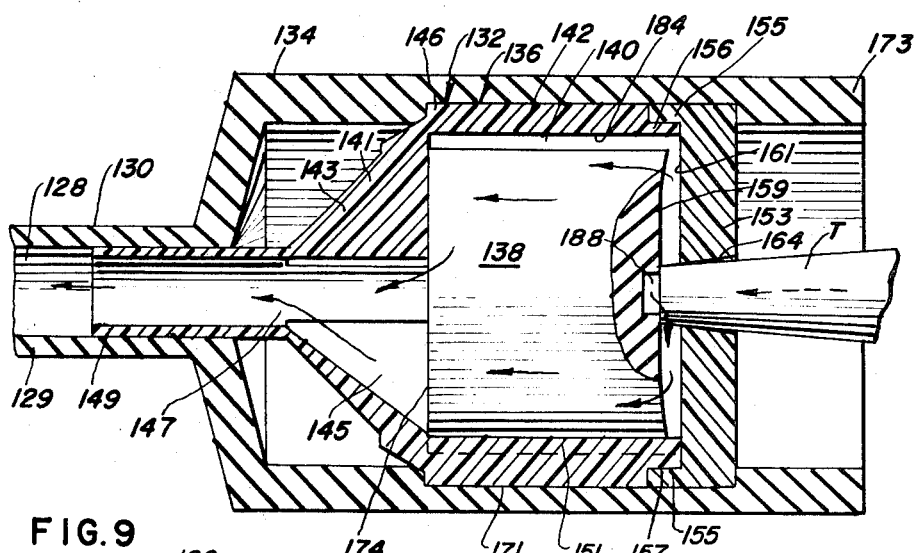
FIG. 8
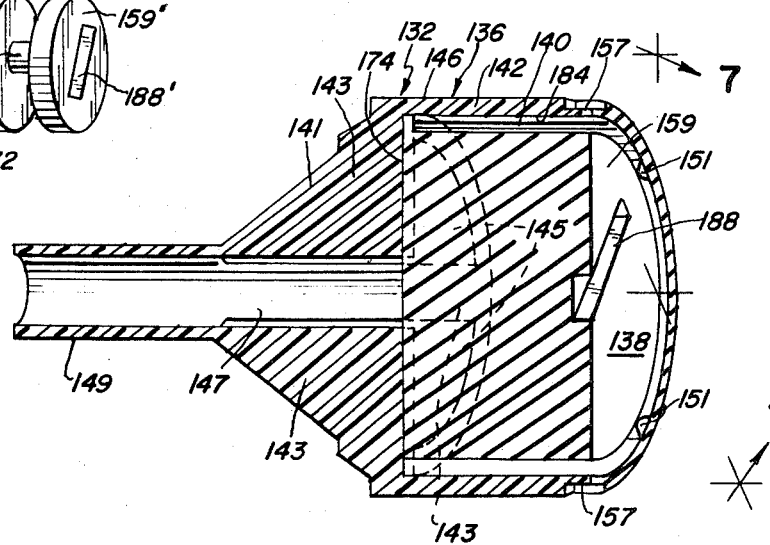
FIG. 9
FIG. 6

INFLATION VALVE FOR CATHETER RETENTION BALLOON

BACKGROUND OF THE INVENTION

1. Field of the Invention

This invention relates to valves, and more particularly to valves for inflating and deflating a catheter balloon.

2. Description of the Prior Art

In utilizing various types of conventional catheters, such as urinary catheters, the distal end of such catheters is inserted into the body cavity of a patient, such as the bladder, and liquid is drained from the body cavity through a lumen in the catheter. Since it is desirable to prevent the removal of the catheter from the body cavity during drainage, inadvertently or otherwise, catheters in the past have been provided with a retention balloon adjacent their distal ends, and the balloon is inflated in the body cavity after insertion of the catheter to hold it in place. After drainage of the body cavity has been completed, the balloon is deflated and the catheter is removed.

Several types of valves have been proposed for inflating and deflating catheter balloons, such as Harautuneian U.S. Pat. No. 3,385,301, Garth U.S. Pat. No. 3,087,492, Swanson U.S. Pat. No. 3,409,015, and Gould et al. U.S. Pat. No. 3,399,677. However, since catheters are frequently intended to be disposable, it is desirable to utilize a simplified valve for the retention balloon, while providing an adequate sealing arrangement in the valve to maintain the balloon inflated over extended periods of time.

SUMMARY OF THE INVENTION

The principal feature of the present invention is the provision of a valve of simplified construction for inflating and deflating a catheter balloon and having an improved sealing construction for retaining fluid in the balloon over protracted periods of time after inflation.

The inflation valve of the present invention is utilized to inflate and deflate the catheter retention balloon through an inflation lumen communicating with the balloon. The valve has a housing which includes, a sidewall extending peripherally around a chamber in the housing, a plate secured to the sidewall adjacent one of its ends and having a plurality of openings communicating between the chamber and the inflation lumen, an inwardly directed flange adjacent the other end of the sidewall, and a rim secured to the flange such that the flange extends between the rim and the sidewall. The rim has a first portion projecting inwardly from the flange into the chamber, a second portion projecting outwardly from the flange relative to the chamber, and a passageway extending through the rim between the chamber and the outside of the housing, with at least a portion of the passageway being tapered from the inner end of the first rim portion. The valve also has a compressible plug received in the chamber which includes, a first shoulder having a lower surface engaging the inner surface of the plate, a neck extending from the first shoulder, a second shoulder extending from the neck, and a tapered stopper extending from the second shoulder and received in the passageway. The first and second shoulders have a plurality of outwardly directed protuberances spaced around their peripheries, with the protuberances extending adjacent to the inner surface of the sidewall. The stopper includes a transverse slot in its upper end, and the first rim portion has a transverse slot in its inner end generally aligned with the slot in the stopper.

A feature of the present invention is that the plug biases the stopper against the inner tapered portion of the passageway in sealing engagement to prevent passage of fluid from the chamber through the passageway.

Another feature of the present invention is that the plug compresses responsive to the insertion of a syringe tip into the passageway from its outer end, such that the stopper partially retracts from the passageway to permit the passage of fluid from the syringe tip into the chamber.

A further feature of the present invention is that the stopper and first rim portion slots facilitate passage of fluid from the syringe tip into the chamber.

Yet another feature of the invention is that the shoulder protuberances retain the plug in an upright position in the chamber, while permitting passage of fluid around the plug into the inflation lumen.

Still another feature of the invention is the provision of means for retaining the syringe to the second rim portion during inflation of the balloon with the plug compressed.

Further features will become more fully apparent in the following description of the embodiments of this invention and from the appended claims.

DESCRIPTION OF THE DRAWINGS

In the drawings:

FIG. 1 is a fragmentary side elevational view, taken partly in section, of a catheter having a retention balloon and the inflation valve of the present invention;

FIG. 2 is an exploded perspective view of a housing plate and compressible plug in one embodiment of the inflation valve, and a fragmentary perspective view of a syringe as aligned with the plug;

FIG. 3 is a side elevational view, taken partly in section, of the inflation valve of FIG. 2 in a sealing configuration;

FIG. 4 is a side elevational view, taken partly in section, of the valve of FIG. 3, with the syringe secured to a housing in the valve for inflating the retention balloon;

FIG. 5 is a fragmentary sectional view of another embodiment of a housing for the valve of FIG. 3;

FIG. 6 is a sectional view of another embodiment of the inflation valve of the present invention with a cap in the valve removed;

FIG. 7 is a side elevational view of the valve of FIG. 6 in a sealing configuration, being taken partly in section along the line 7—7 of FIG. 6;

FIG. 8 is a side elevational view of the valve of FIG. 7, being taken partly in section as the valve in FIG. 7, with a syringe tip inserted into the valve for inflating the catheter balloon; and FIG. 9 is a perspective view of another embodiment of a compressible plug for the valve of FIGS. 6–8.

DESCRIPTION OF THE PREFERRED EMBODIMENT

Referring now to FIG. 1, a catheter, generally designated 20, is shown having a drainage lumen 22 extending through the catheter and communicating with a drainage eye 24 adjacent a distal end 25 of the catheter 20, and having a retention balloon 26 adjacent its distal end 25. The catheter 20 has a sidearm 30 extending outwardly from a sidewall 27 of the catheter, and an inflation lumen 28 extends through the catheter sidewall 27 and a tubular portion 29 of the sidearm 30, such that the inflation lumen 28 communicates between the balloon 26 and an inflation valve designated generally 32 which is retained in a sleeve 34 at the outer end of the sidearm 30. In operation, the distal end 25 of the catheter is inserted into a body cavity of a patient and liquid from the body cavity drains through the eye 24 and lumen 22 to liquid collection apparatus (not shown) connected to a proximal end 31 of the catheter. In order to retain the catheter in the body cavity, fluid is injected through the inflation valve 32, such as by a syringe, into the inflation lumen 28 to inflate the balloon 26 in the body cavity. After expansion, the balloon 26 retains the catheter in the cavity, and when drainage is complete, often after protracted periods of time, the balloon 26 is deflated by withdrawing the fluid from the balloon through the lumen 28 and valve 32 to permit removal of the catheter from the body.

As illustrated in FIGS. 3 and 4, the inflation valve 32 of the present invention includes a housing designated generally 36 and a compressible plug designated generally 38, which is retained in a chamber 40 in the housing. The housing 36 has an annular sidewall 42 which extends peripherally around the chamber 40, and a plate 44 secured to one end 46 of the sidewall 42 by an annular flange 48 which is received in a corresponding annular groove 50 in the one sidewall end 46. As shown in FIGS. 2-4, the plate 44 has a plurality of openings 52 communicating between the chamber 40 and the inflation lumen 28. As illustrated in FIGS. 3 and 4, the housing 36 also has an inwardly directed flange 54 adjacent the other end 56 of the sidewall 42, and an annular rim 58 is attached to the flange 54, such that the flange 54 extends between the rim 58 and the sidewall 42. The rim 58 has a first portion 60 projecting inwardly from the flange 54 into the chamber 40, and a second portion 62 projecting outwardly from the flange 54 relative to the chamber. The rim 58 also has a passageway 64 extending trough the rim between the chamber 40 and the outside of the housing 36. A first portion 66 of the passageway 64 is tapered from the inner end of the first rim portion 60, and, preferably, a second portion 68 of the passageway 64 is tapered from the outer end of the second rim portion 62 to receive the tip T of a syringe S. The first rim portion 60 has a transverse slot 70, for a purpose which will be described below.

The sleeve 34 has an annular groove 71, and the housing 36 is received in the groove 71 to retain the housing in position in the sleeve 34 and hold the assembled plate 44 and sidewall 42 together. Preferably, the groove 71 is located a sufficient distance from the outer end 73 of the sleeve 34 such that the second rim portion 62 of the housing does not extend out of the sleeve, in order that the outer sleeve end 73 protects the valve and prevents inadvertent injury to the patient, such as scratching of the patient's body by the second rim portion 62.

As illustrated in FIGS. 2-4, the compressible plug 38 includes a first shoulder 72 having a lower surface 74 engaging an inner surface 76 of the plate 44 relative to the chamber 40. The plug also has a neck 78 of restricted diameter extending from the first shoulder 72, and a second shoulder 80 of enlarged diameter extending from the neck 78. The first and second shoulders 72 and 80 have a plurality of outwardly directed protuberances 82 extending adjacent to an inner surface 84 of the sidewall 42 to retain the plug 38 in an upright position in the chamber 40, while permitting relative movement of the plug 38 in the chamber, and particularly the second shoulder 80. The plug also includes a tapered stopper 86 extending from the second shoulder 80, and the stopper 86 has a transverse slot 88 at its upper end.

As shown in FIG. 3, the compressible plug biases the stopper 86 against the inner tapered portion 66 of the passageway 64 in sealing engagement to prevent passage of fluid from the chamber 40 into the passageway. Thus, once the balloon has been inflated, the resiliency and flexibility of the plug causes sealing in the valve, and the sealing surfaces of the stopper and rim prevents the escape of fluid from the inflated balloon 26 over extended periods of time.

As illustrated in FIG. 4, the tip T of the syringe S is inserted into the outer end of the passageway 64 to inflate the balloon 26. Once the syringe tip engages the upper end of the stopper 86, the plug compresses responsive to further insertion of the tip. After the syringe has been inserted sufficiently far to compress the plug, fluid is forced from the syringe through its tip T into the slot 88, which permits passage of fluid around the upper end of the stopper 86. From the slot 88, the fluid passes through the first rim portion slot 70, which is preferably aligned with the stopper slot 88, and into the chamber 40. The direction of fluid flow from the syringe tip T to the chamber 40 is indicated by arrows in FIG. 4. Thus, the slots 88 and 70 facilitate the passage of fluid from the syringe tip T into the chamber, since they permit fluid communication between the tip and chamber after only a relatively slight compression of the plug. In the chamber, fluid passes around the sides of the plug shoulders 72 and 80 between the protuberances 82, through the plate openings 52, and into the inflation lumen 28, as indicated by the arrows in FIG. 4, to inflate the balloon 26. During inflation of the balloon, the syringe tip T engages the outer tapered passageway portion 68 to prevent leakage of fluid out of the housing 36. Preferably, the second rim portion 62 includes an outwardly directed thread 90, which in conjunction with a thread T' on the syringe serves as a Luer lock or means for retaining the syringe to the second rim portion 62 during inflation and deflation of the balloon 26 with the plug compressed. However, if desired the Luer lock may be omitted from the valve, in which case the frictional engagement between the syringe tip and the passageway portion 68 serves to retain the syringe tip in position in the passageway 64.

The deflation of the catheter balloon is accomplished in a manner similar to its inflation. The syringe tip T is inserted into the outer end of the passageway 64, and the syringe is locked in place by the interengaging threads 90 and T', with the syringe tip T compressing the plug 38. A vacuum is then created in the syringe, such as by withdrawing a plunger (not shown), and fluid reverses its path from the balloon 26 into the chamber 40 and through the slots 70 and 88 into the syringe tip T.

As shown in FIG. 5, the first rim portion 60 may alternatively have a plurality of notches 65 facing the passageway 64 adjacent the inner end of the first rim portion 60 and preferably aligned with the stopper slot 88 to facilitate passage of fluid from the passageway into the chamber in a manner similar to that described in connection with the slot 70. However, in this embodiment of the valve 32, the first rim portion 60 has a circumferentially extending sealing surface 67 at its inner end which sealingly engages against the upper surface of the second shoulder 80 to additionally insure against the escape of fluid from the inflated valve.

Another embodiment of the inflation valve of the present invention is illustrated in FIGS. 6–8, in which like reference numerals are incremented by one hundred to designate like parts. The inflation valve 132 includes a housing having an annular side wall 142 extending peripherally around a chamber 140 in which a cylindrically-shaped compressible plug 138 is retained. The housing includes a base portion 141 extending from one end 146 of the sidewall 142 and having a plurality of inwardly directed support flanges 143, which define a plurality of channels 145 intermediate the flanges 143. The channels 145 extend from adjacent an inner surface 184 of the sidewall 142, such that they communicate between the chamber 140 and the inflation lumen 128 through a centrally located channel 147, also defined by the flanges 143 and an outer end 149 of the base portion 141.

The housing side wall 142 has a plurality of beads 151 spaced peripherally around the sidewall, which extend longitudinally along the inner surface 184 of the sidewall. The beads 151 project inwardly adjacent to the plug 138 in order to retain the plug in an upright position and permit slight compression of the plug in the chamber 140. A cap 153 is secured to the other sidewall end 156 by a plurality of flanges 155 depending from the cap 153 and a corresponding set of grooves 157 in the sidewall which receive the flanges 155. The cap 153 has a centrally located passageway 164 which is tapered to receive and engage the tip T of the syringe.

The plug 138 has a lower surface 174 which engages the support flanges 143, and an upper surface 159 biased by the compressible plug against a lower surface 161 of the cap 153, as shown in FIG. 7. Thus, the surfaces 159 and 161 of the plug and cap, respectively, make a sealing engagement to prevent passage of fluid from the balloon and valve chamber after the balloon has been inflated.

In order to inflate the balloon, the syringe tip T is inserted into the passageway 164 until the tip slightly compresses the plug 138 in the chamber, as illustrated in FIG. 8. Fluid from the syringe tip passes into a slot 188 in the upper end of the plug 138, and passes from the slot 188 between the now spaced plug and cap surfaces 159 and 161, around the side of the plug intermediate the beads 151, and through the channels 145 and 147 into the inflation lumen 128 leading to the balloon, as indicated by the arrows in the drawing. If desired, the valve of FIGS. 6–8 and syringe may have a Luer lock similar to that described for the valve of FIGS. 1–5 to retain the syringe to the valve with the plug compressed. When the syringe tip T is removed from the passageway 164, the plug sealingly engages against the cap, as previously described. Fluid is withdrawn from the balloon in a manner similar to the procedure described in connection with the inflation valve of FIGS. 1–5.

Another embodiment of a plug for the valve of FIGS. 6–8 is illustrated in FIG. 9. In this embodiment, the flexible plug 138' has a lower first shoulder 172, a neck 178 extending from the first shoulder 172, and a second upper shoulder 180 extending from the neck 178. An upper surface 159' of the second shoulder 180 is biased by the plug 138' against the lower surface 161 of the cap 153, and the second shoulder 180 has a transverse slot 188' in its upper surface 159' to facilitate fluid passage from the syringe tip. In operation, the plug 138' functions in a manner similar to the plug 138, as previously described.

The foregoing detailed description is given for clearness of understanding only, and no unnecessary limitations should be understood therefrom, as modifications will be obvious to those skilled in the art.

I claim:

1. In a catheter including a retention balloon and an inflation lumen communicating with said balloon, an inflation valve comprising:
    a housing including,
        a sidewall extending peripherally around a chamber in the housing,
        a plate secured to the sidewall adjacent one of its ends and having a plurality of openings communicating between said chamber and inflation lumen,
        an inwardly directed flange adjacent the other end of the sidewall, and
        a rim attached to the flange with the flange extending between the rim and the sidewall, said rim having a first portion projecting inwardly from the flange into the chamber, a second portion projecting outwardly from the flange relative to the chamber, and a passageway extending through the rim between the chamber and the outside of the housing, with at least a portion of said passageway being tapered from adjacent the inner end of the first rim portion; and
    a compressible plug retained in the chamber and including,
        a first shoulder having a lower surface engaging the inner surface of said plate,
        a neck extending from said first shoulder,
        a second shoulder extending from said neck, said first and second shoulders having a plurality of outwardly directed protuberances spaced around their peripheries, with said protuberances extending adjacent to the inner surface of said sidewall to retain the plug in an upright position in the chamber, and
        a tapered stopper extending from said second shoulder and received in said passageway, with said plug biasing the stopper against the inner tapered portion of said passageway in sealing engagement to prevent passage of fluid from the chamber through the passageway, and said plug compressing responsive to the insertion of a syringe tip into the passageway from its outer end, whereby the stopper at least partially retracts from the passageway to permit the passage of fluid from the syringe tip into the chamber.

2. The inflation valve of claim 1 wherein said stopper includes a transverse slot adjacent its upper end to facilitate the passage of fluid from the syringe tip.

3. The inflation valve of claim 2 wherein the first rim portion includes a transverse slot adjacent its inner end to facilitate passage of fluid from the passageway into the chamber.

4. The inflation valve of claim 3 wherein said stopper and first rim portion slots are generally aligned.

5. The inflation valve of claim 2 wherein the first rim portion has a plurality of notches adjacent its inner end and facing the passageway to facilitate passage of fluid from the passageway into the chamber.

6. The inflation valve of claim 5 wherein said notches and stopper slot are generally aligned.

7. The inflation valve of claim 1 wherein the first rim portion has a surface adjacent its inner end to sealingly engage against an upper surface of the second shoulder.

8. The inflation valve of claim 1 including means for retaining the syringe to the second rim portion with the syringe tip compressing the plug during inflation and deflation of the balloon.

* * * * *